United States Patent [19]
Mazzinghi

[11] Patent Number: 4,857,286
[45] Date of Patent: Aug. 15, 1989

[54] METHOD FOR PRODUCING SODIUM TETRABORATE PENTAHYDRATE

[75] Inventor: Paolo Mazzinghi, Pomarance, Italy

[73] Assignee: Societa Chimica Larderello S.p.A., Milan, Italy

[21] Appl. No.: 68,114

[22] Filed: Jun. 29, 1987

[30] Foreign Application Priority Data

Jul. 25, 1986 [IT] Italy ................ 21259 A/86

[51] Int. Cl.$^4$ ............................................. C01B 35/10
[52] U.S. Cl. ................................... 423/282; 423/277; 423/280
[58] Field of Search ............... 423/276, 277, 279, 280, 423/286, 282

[56] References Cited

U.S. PATENT DOCUMENTS

| 2,768,883 | 10/1956 | Young | 423/277 |
| 2,983,577 | 5/1961 | Morgan | 423/280 |
| 3,309,170 | 3/1967 | Griswold | 423/279 |
| 3,336,103 | 8/1967 | Schumacher et al. | 423/280 |

FOREIGN PATENT DOCUMENTS

| 633806 | 11/1978 | U.S.S.R. | 423/279 |
| 1033434 | 8/1983 | U.S.S.R. | 423/279 |
| 812486 | 4/1959 | United Kingdom | 423/277 |
| 1286841 | 8/1972 | United Kingdom | 423/279 |

Primary Examiner—John Doll
Assistant Examiner—Wayne A. Langel
Attorney, Agent, or Firm—Hedman, Gibson, Costigan & Hoare

[57] ABSTRACT

High-purity sodium tetraborate pentahydrate ($Na_2B_4O_7.5H_2O$) is produced by:
  (a) reacting the mineral colemanite ($2CaO.3B_2O_3.5H_2O$) with sodium carbonate ($Na_2CO_3$) in an aqueous environment to produce an aqueous solution of sodium tetraborate and sodium hydroxide, with precipitation of solid calcium carbonate;
  (b) treating the aqueous solution obtained in stage (a), after separating the precipitated calcium carbonate, with boric acid ($H_3BO_3$) to neutralize the sodium hydroxide and form a further quantity of sodium tetraborate;
  (c) separating sodium tetraborate pentahydrate by crystallization from the aqueous solution obtained in stage b.

7 Claims, No Drawings

METHOD FOR PRODUCING SODIUM TETRABORATE PENTAHYDRATE

This invention relates to a method for preparing high-purity sodium tetraborate pentahydrate ($Na_2B_4O_7.5H_2O$) from the mineral colemanite and sodium carbonate.

Sodium tetraborate pentahydrate is a product used in certain industrial sectors, for example in antifreeze solutions as a corrosion inhibitor, in adhesives and in the manufacture of borates such as zinc borate. In particular, sodium tetraborate pentahydrate is an important commercial form of borax (sodium tetraborate decahydrate) as the pentahydrate form is more economical than the decahydrate form because of its lower transport, handling and storage costs.

In the known art, borate salts are generally prepared by neutralising boric acid with a suitable base. The boric acid itself is obtained from inorganic mineral borates (usually sodium borate or calcium borate) by treatment with aqueous sulphuric acid, possibly after prior liquid/liquid extraction of the mineral. For this known method reference should be made to K.A.L.G. Watt, World Minerals and Metals No. 22, British Sulphur Corp. Ltd. 1973, pages 5–12 and to the description of USA patents 2,969,275, 3,424,563, 3,479,294 and 3,493,349.

This state of the art has produced a requirement for methods for the preparation of borate salts of adequate purity, and in particular of sodium tetraborate pentahydrate, directly from the mineral without the intermediate preparation of boric acid, thus considerably simplifying methods of the known art.

Such a requirement is satisfied by the method of the present invention, according to which sodium tetraborate pentahydrate ($Na_2B_4O_7.5H_2O$) is prepared by:

(a) reacting the mineral colemanite ($2CaO.3B_2O_3.5H_2O$) with sodium carbonate ($Na_2CO_3$) in an aqueous environment to produce an aqueous solution of sodium tetraborate and sodium hydroxide, with precipitation of solid calcium carbonate;

(b) treating the aqueous solution obtained in stage (a), after separating the precipitated calcium carbonate, with boric acid ($H_3BO_3$) to neutralise the sodium hydroxide and form a further quantity of sodium tetraborate;

(c) separating sodium tetraborate pentahydrate by crystallisation from the aqueous solution obtained in stage (b).

In a preferred embodiment, the mineral colemanite is calcined and ground before reaction with the sodium carbonate.

According to a further preferred embodiment, the discharge liquor from the crystallisation stage (c) is used in stage (a) to form the aqueous environment for the reaction between the mineral colemanite and sodium carbonate.

The mineral colemanite, used as raw material in the method of the present invention, is a calcium borate which can be represented by the formula $2CaO.3B_2O_3.5H_2O$. The mineral contains various impurities and especially iron, magnesium, aluminium and arsenic salts, and a certain quantity of "free" water, generally of the order of 5–6% by weight.

This mineral is conveniently reduced to a suitable particle size generally of the order of 10–20 mm, and is then calcined at a temperature within the range of 250° to 450° C. for a time of from 1 to 2 hours. This operation, which takes place in air, is preferably conducted in kilns which enable the mineral granules to be kept in movement. The calcined mineral is then reduced to a fine powder.

STAGE (a)

According to the method of the present invention, the mineral colemanite after calcining and grinding is reacted with sodium carbonate in an aqueous environment to form an aqueous solution of sodium tetraborate and sodium hydroxide, with precipitation of solid calcium carbonate.

The reaction can be represented by the equation:

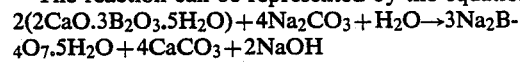

$$2(2CaO.3B_2O_3.5H_2O) + 4Na_2CO_3 + H_2O \rightarrow 3Na_2B_4O_7.5H_2O + 4CaCO_3 + 2NaOH$$

This stage can be carried out with a weight ratio of colemanite to sodium carbonate variable generally from 2.0 to 2.1, the stoichiometric quantity of the two reagents being preferred for the reaction leading to the formation of sodium tetraborate. The reaction temperature can vary generally from 87° to 97° C., but is of the order of 95° C. in the preferred embodiment.

In practice, the calcined ground colemanite and the powdered sodium carbonate can be fed to a stirred reactor provided with temperature control means and containing the aqueous reaction medium.

Preferably said aqueous reaction medium is the discharge liquor from the sodium tetraborate pentahydrate crystallisation, and originates from a previous cycle.

The sodium carbonate can be totally or partly replaced by equivalent quantities of sodium bicarbonate to obtain still useful results.

When operating under the aforesaid preferred conditions, reaction yields of the order of 98–99% are obtained.

STAGE (b)

The aqueous suspension obtained in stage (a) is treated to separate the calcium carbonate from the aqueous solution containing sodium tetraborate and sodium hydroxide. Filtration is conveniently used for this purpose, being carried out within a temperature range in which no precipitation occurs.

Convenient temperatures are those stated for the preceding stage (a). The filter panel is washed with deionised water and the wash water is added to the filtrate.

According to the method of the present invention, boric acid is added to the aqueous solution obtained in this manner, to neutralise the sodium hydroxide and form further quantities of sodium tetraborate in accordance with the equation:

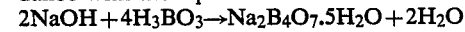

$$2NaOH + 4H_3BO_3 \rightarrow Na_2B_4O_7.5H_2O + 2H_2O$$

Conveniently, the added boric acid quantity is stoichiometrically equivalent to the sodium hydroxide quantity in the solution. In this reaction stage, the operating temperature is within the range of 93° to 97° C. and preferably of the order of 95° C.

STAGE (c)

In this stage, the sodium tetraborate pentahydrate is separated by crystallisation from the solution originating from the preceding stage (b).

The crystallisation is conveniently conducted by cooling the solution for example to about 70° C., and the precipitated salt is separated for example by centrifuging. The discharge liquor can be recycled to the process stage (a).

When operating under the aforesaid conditions sodium tetraborate pentahydrate can be obtained with a yield of the order of 96%, evaluated with respect to $B_2O_3$.

Such sodium tetraborate pentahydrate generally has a purity equal to or greater than 99%.

The experimental example given hereinafter illustrates the present invention but without limiting its scope.

EXAMPLE

An AISI 316 stainless steel reactor is used, fitted with a stirrer, a diathermic fluid temperature control system, and a feed system for solid substances in powder form.

5300 kg of crystallisation discharge liquor originating from a previous cycle and containing sodium tetraborate at a concentration of 231 g/kg (expressed as $Na_2B_4O_7$) equivalent to 165 g/kg of $B_2O_3$, are fed into the reactor.

The temperature is raised to about 95° C. and, while keeping the mass stirred, 410 kg of calcined and ground colemanite having a $B_2O_3$ content of 42.7% by weight plus 200 kg of powdered sodium carbonate are gradually fed in over a time of about 0.5 hours. After the end of this period, the mass is kept stirring for a further 1.5 hours at the aforesaid temperature, after which the hot suspension is filtered under hot conditions through an AISI 316 stainless steel filter press.

The filter panel is washed with 300 kg of deionised water at a temperature of 90° C. and the wash water is added to the filtrate to provide 5670 kg of an aqueous solution containing sodium tetraborate at a concentration of 260 g/kg (expressed as $Na_2B_4O_7$), equivalent to 80 g/kg as $B_2O_3$, and sodium hydroxide at a concentration of 76 g/kg (expressed as $Na_2O$). 100 kg of boric acid are added to the stirred solution, operating at about 95° C. The resultant solution is cooled to about 70° C. with consequent crystallisation of sodium tetraborate pentahydrate, which is separated by centrifuging.

In this manner, 355 kg of sodium tetraborate pentahydrate are recovered with a yield of 96% evaluated with respect to $B_2O_3$. The purity of the obtained sodium tetraborate pentahydrate is 99%.

The crystallisation discharge liquor containing sodium tetraborate at a concentration of 231 g/kg (expressed as $Na_2B_4O_7$), equivalent to 160 g/kg of $B_2O_3$, is recycled to the colemanite and sodium carbonate reaction stage.

I claim:

1. In the process of preparing sodium tetraborate pentahydrate ($Na_2B_4O_7 \cdot 5H_2O$) from colemanite ore by treatment with sodium carbonate and boric acid, the improvement comprising
   (a) first reacting the mineral colemanite ($2CaO \cdot 3B_2O_3 \cdot 5H_2O$) with sodium carbonate ($Na_2CO_3$) in an aqueous environment in the absence of boric acid to produce an aqueous solution of sodium tetraborate and sodium hydroxide, with precipitation of solid calcium carbonate;
   (b) treating the aqueous solution obtained in stage (a), after separating the precipitated calcium carbonate, with boric acid ($H_3BO_3$) with no further addition of sodium carbonate to neutralise the sodium hydroxide and form a further quantity of sodium tetraborate;
   (c) separating sodium tetraborate pentahydrate by crystallisation from the aqueous solution obtained in stage (b).

2. A method as claimed in claim 1, characterised in that the colemanite is previously calcined at a temperature of between 250° and 450° C. for a time of between 1 and 2 hours and ground to a powder.

3. A method as claimed in claim 1, characterised in that stage (a) is carried out with a weight ratio of colemanite to sodium carbonate of between 2.0 and 2.1, at a temperature of between 87° and 97° C.

4. A method as claimed in claim 3, characterised by operating with a stoichiometric quantity of colemanite and sodium carbonate for the reaction which leads to the formation of sodium tetraborate pentahydrate, at a temperature of about 95° C.

5. A method as claimed in claim 1, characterised in that the aqueous reaction medium of stage (a) is the crystallisation discharge liquor recycled from stage (c).

6. A method as claimed in claim 1, characterised in that in stage (b) the calcium carbonate is separated under hot conditions, the boric acid and sodium hydroxide being reacted in stoichiometic quantities at a temperature of between 93° and 97° C.

7. A method as claimed in claim 1, characterised in that in stage (c) the sodium tetraborate pentahydrate crystallisation is conducted at a temperature of about 70° C.

* * * * *